United States Patent [19]

Lin

[11] Patent Number: 5,309,941

[45] Date of Patent: May 10, 1994

[54] AUTO WATER SUPPLY CONTROL VALVE

[76] Inventor: Chion-Dong Lin, P.O. Box No. 96-173, Taipei, Taiwan

[21] Appl. No.: 71,489

[22] Filed: Jun. 4, 1993

[51] Int. Cl.⁵ .......................... F16K 31/62; E03C 1/02
[52] U.S. Cl. ................................ 137/614.19; 251/295; 251/324
[58] Field of Search ............................. 251/295, 324; 137/614.19

[56] References Cited

U.S. PATENT DOCUMENTS

| | | | |
|---|---|---|---|
| 533,021 | 1/1895 | Scott | 251/295 X |
| 1,004,467 | 9/1911 | Renwick et al. | 251/295 X |
| 1,083,382 | 1/1914 | Wenker et al. | 251/295 X |
| 1,131,570 | 3/1915 | Taylor | 251/295 X |
| 1,562,979 | 11/1925 | Muend | 251/295 X |
| 1,587,516 | 6/1926 | Forfar | 251/295 X |
| 1,629,496 | 5/1927 | Fraser | 251/295 X |
| 1,779,064 | 10/1930 | Gohring | 251/295 X |
| 2,042,278 | 5/1936 | Sloan | 251/295 X |
| 2,053,640 | 9/1936 | Sloan | 251/295 X |
| 2,667,889 | 2/1954 | Murdock et al. | 251/295 X |

*Primary Examiner*—John Rivell
*Attorney, Agent, or Firm*—Bacon & Thomas

[57] ABSTRACT

This invention relates to a foot operated control valve in which the water supply is automatically stopped as soon as a foot push button is released. It is not only convenient for use, but can also economize water consumption by means of auto start and stop fully under foot control. The control valve has a housing and a valve body. The valve body includes an inlet cylinder and an outlet cylinder with both cylinders integrally communicated by means of a channel. The inlet cylinder having an adjustment assembly to open or block the water inlet. The outlet cylinder has a spring, valve and sleeve, in which the valve is movable to block or open the valve inlet for stopping or allowing water entry into the outlet. The open/close function can be accomplished by a valve opened by foot or closed by resilience of a spring to ensure that the use and water economization can be accomplished. The user is not required to control the faucet by hand, thereby eliminating its risk of water waste as a result of failing to shut off the faucet or failure to close fully because of faucet malfunction.

1 Claim, 4 Drawing Sheets

AUTO WATER SUPPLY CONTROL VALVE

FIELD OF THE INVENTION

This invention relates to a foot operated water supply control valve, and more particularly to a foot operated push type control valve that is applicable as a flush valve, or hand washing under foot push control in which the water supply is automatically stopped as soon as the foot button is released. It is not only convenient for use, but can also economize water consumption by means of auto start and stop under foot push control.

BACKGROUND OF THE INVENTION

Conventional faucets have a wide variety of styles and operations. However, if the user forgets to close the faucet handle as a result of drying hands, fails to close it tightly, the faucet has malfunctioned, or the faucet has been opened by a prankster, water flow will continue without stop so as to cause waste. Though the optical sensor type is an improvement which allows the water supply to be stopped as soon as the user leaves or after flushing fr a specific time, it has a higher possibility of failure due to its electronics. Furthermore, it has a high production cost, complex assembly work, additional power consumption by connection to an external power source, and involves a high risk of safety in a wet environment.

DETAILED DESCRIPTION OF THE PREFERRED EMBODIMENT

Figure 1:
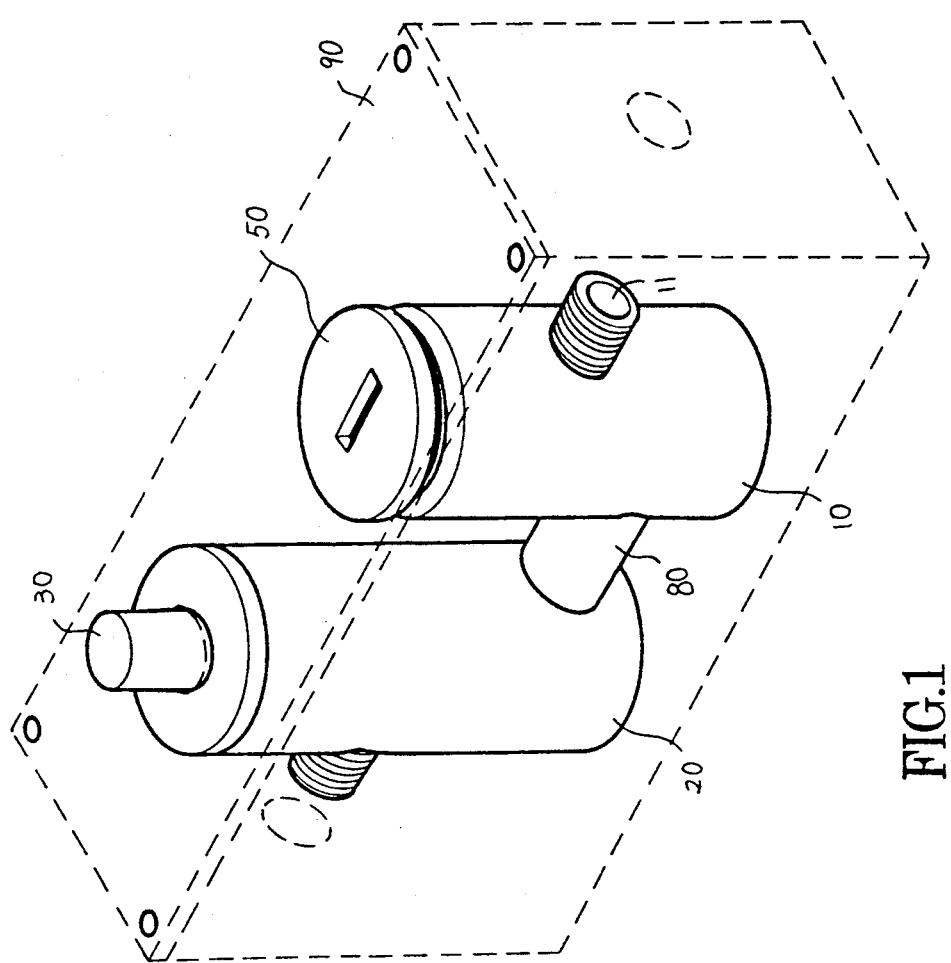
FIG. 1 is a perspective view of the present invention.
Figure 2:
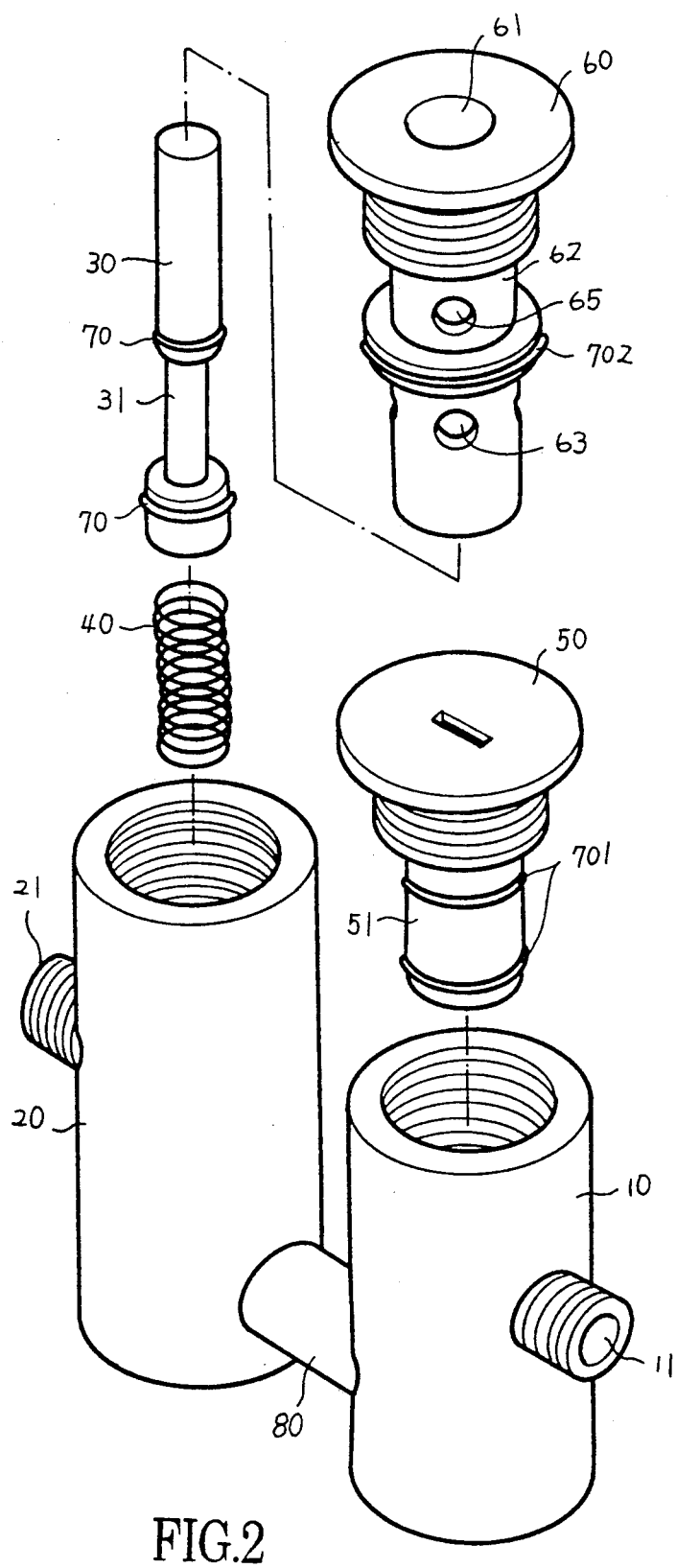
FIG. 2 is an exploded perspective view of the present invention.

Referring to FIGS. 1 and 2, the invention comprises a valve body in housing 90. The housing 90 may be embedded under the floor. The valve body contains an intake cylinder 10 and an outlet cylinder 20. Both cylinders are integrally communicated by means of a channel 80. The intake cylinder 10 has an inlet 11 for connecting to a water pipeline (not shown), and accommodates an adjustment assembly 50, having cock 51 and an O-ring 701 to prevent leakage. The outlet cylinder 20 is a hollow body with an outlet 21 and a sleeve 60. A valve 30 is inserted through hole 61 into the sleeve 60 and has a stainless steel spring 40 bearing against a lower side. The sleeve 60 includes an inlet 63, an outlet 65, an annular outlet groove 62, and an O-ring 702 is mounted between the inlet 63 and outlet 65 in the outlet cylinder 20 to prevent leakage. The valve 30 has a ring-shaped recess 31, and O-rings 70 mounted near the ends and bearing against sleeve 60 to prevent leakage.

Figure 3:
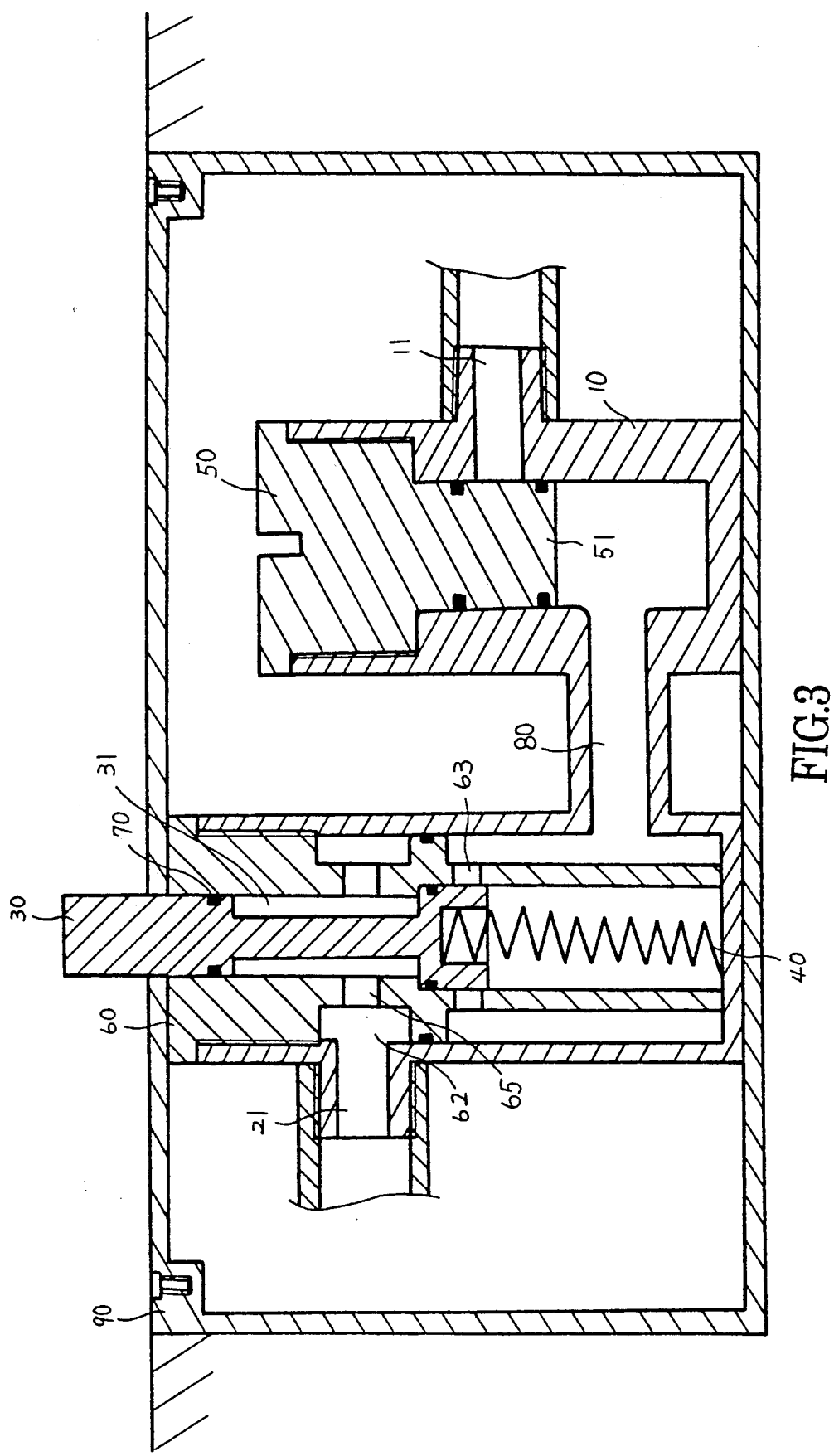
FIG. 3 is a cross-sectional view showing the state of water stoppage according to the invention.

Referring to FIG. 3, the adjustment assembly 50 in the intake cylinder 10 can be adjusted by shifting its position up or down to operate the cock 50 allowing a change in the open portion of the inlet 11. The area of inlet 11 opened by the cock 51 may be adjusted so as to control the incoming water volume. When the valve is not open, the spring 40 in the outlet cylinder 20 will resiliently push up the valve 30 allowing the end stem of the valve to stop water flow from the channel 80 passing through the inlet 63, i.e., water flow is prohibited from passing through the inlet 63 and certainly is not likely to enter the recess 31 and therefore has become a choked water flow not allowing water to pass through the outlet 65 of the sleeve 60.

Figure 4:
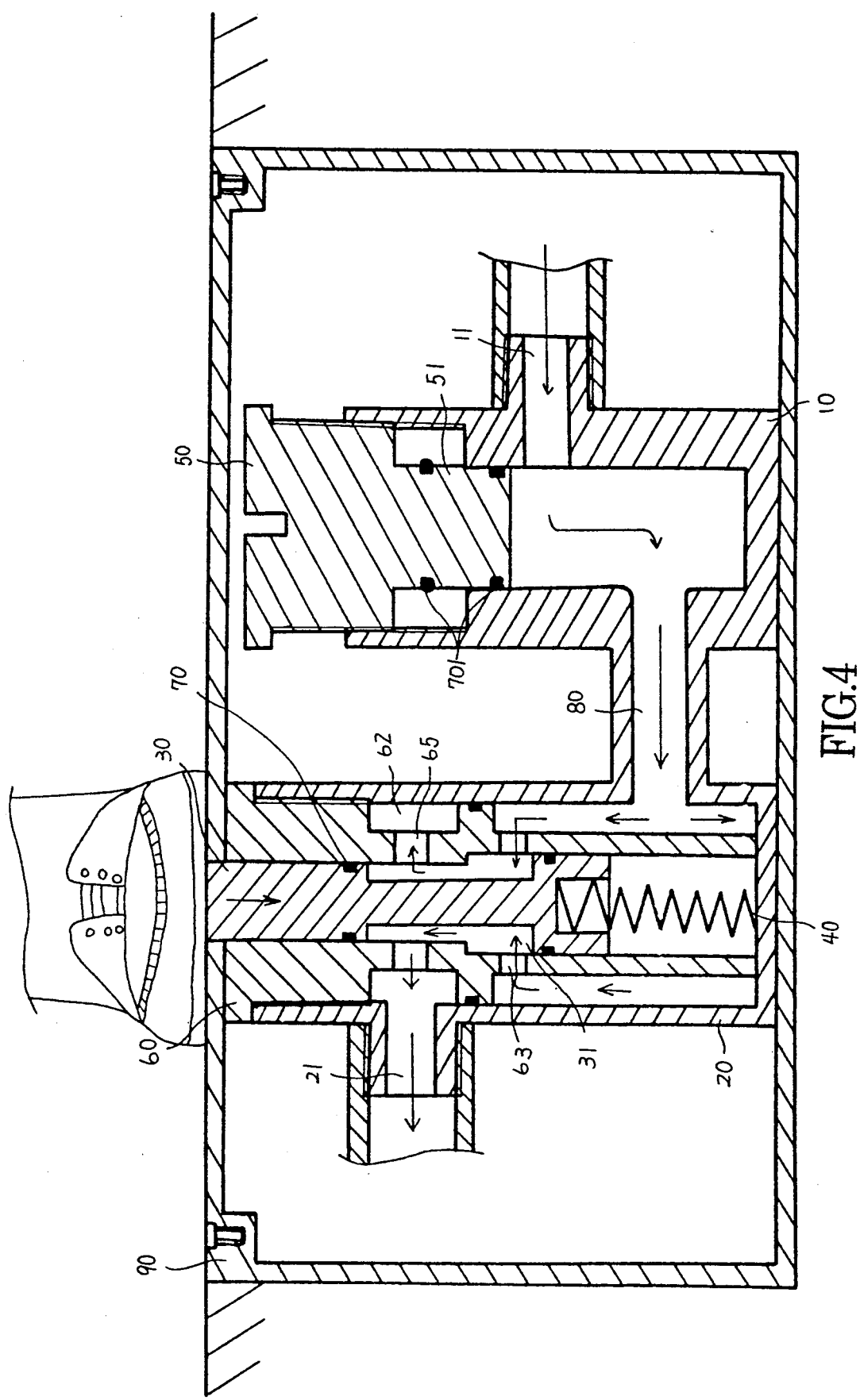
FIG. 4 is a partial cross-sectional view of the invention in use.

Referring to FIG. 4, when the user has stepped down on the valve 30, the end of the valve 30 will open the inlet 63 allowing water to enter the recess 31 and to further enter the outlet groove 62 by means of the outlet 65 and pass through the outlet 21. It permits the user to control the faucet without using hands but to have water supply for use until the user has released the foot from the valve 30. Once the foot is removed, the stainless steel spring 40 forces the valve 30 to move up to again block the inlet 63 from water entry.

Therefore, the invention has the following advantages: (1) it is embedded under the floor without occupying any floor space; (2) the water volume is adjustable; (3) the foot push type of operation has a quick control manner, and is especially fast in stopping water output to save water consumption; (4) all structural members may be integrally molded by plastic injection molding making for easy assembly and maintenance; (5) leakage-proof is ensured by full water stoppage, unlike the faucet (valve cock type) with risk of leakage due to being partially closed; (6) foot push control without the necessity of hand tough meets sanitary requirements while providing a water stoppage for economizing water consumption.

What is claimed is:

1. A foot actuated water supply control valve comprising:
    a) a valve body comprising:
        i) a first cylinder having an inlet to allow water to enter the first cylinder;
        ii) a second cylinder having an outlet to allow water to exit from the second cylinder; and,
        iii) channel means connecting the first and second cylinders so as to allow water to pass from the first cylinder into the second cylinder;
    b) an adjustment valve connected to the first cylinder to adjust the flow of water into the first cylinder;
    c) a sleeve attached to and extending into the second cylinder, the sleeve defining a passageway and at least one sleeve outlet opening communicating with the passageway and the second cylinder outlet, and having a wall defining at least one sleeve inlet opening to allow water to pass into the passageway;
    d) a valve member slidably mounted in the passageway, the valve member having a first end extending externally of the valve body, a second end and a recessed portion between the first and second ends, the valve member movable in the passageway along a path of travel extending generally parallel to the wall of the sleeve and to a plane of the sleeve inlet opening between a first position wherein the second end of the valve member blocks the at least one inlet opening to prevent water from entering the passageway and a second position wherein the second end is displaced away from the sleeve inlet opening to allow water to pass between the sleeve inlet opening and the sleeve outlet opening via the recessed portion of the valve member; and
    e) biasing means acting on the second end of the valve member to bias the valve member toward its first position.

* * * * *